(12) United States Patent
Burton et al.

(10) Patent No.: US 8,779,638 B2
(45) Date of Patent: Jul. 15, 2014

(54) RETAINING SLEEVE FOR OVER MOLDING MAGNETS

(75) Inventors: Stephen Burton, Fenton, MO (US); Brian Klein, St. Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 215 days.

(21) Appl. No.: 12/891,533

(22) Filed: Sep. 27, 2010

(65) Prior Publication Data

US 2012/0074807 A1    Mar. 29, 2012

(51) Int. Cl.
*H02K 1/27* (2006.01)

(52) U.S. Cl.
CPC ...................................... *H02K 1/278* (2013.01)
USPC .............................. 310/43; 310/156.8; 29/596

(58) Field of Classification Search
USPC ...................... 310/43, 156.21–156.28; 29/596
See application file for complete search history.

(56) References Cited

U.S. PATENT DOCUMENTS

| | | | | |
|---|---|---|---|---|
| 3,246,187 A | * | 4/1966 | Iemura | 310/156.21 |
| 4,625,392 A | * | 12/1986 | Stokes | 29/598 |
| 4,683,393 A | * | 7/1987 | Stokes | 310/156.13 |
| 4,795,932 A | * | 1/1989 | Long | 310/154.14 |
| 4,801,834 A | * | 1/1989 | Stokes | 310/156.12 |
| 4,877,986 A | * | 10/1989 | Shimizu | 310/153 |
| 4,910,861 A | | 3/1990 | Dohogne | |
| 4,973,872 A | * | 11/1990 | Dohogne | 310/156.28 |
| 5,175,461 A | | 12/1992 | Zigler et al. | |
| 5,488,260 A | | 1/1996 | Heyraud | |
| 6,750,580 B2 | * | 6/2004 | Lai et al. | 310/156.28 |
| 6,903,475 B2 | * | 6/2005 | Ortt et al. | 310/154.07 |
| 7,091,642 B2 | * | 8/2006 | Agnes et al. | 310/154.12 |
| 7,474,028 B2 | * | 1/2009 | Shim et al. | 310/156.53 |
| 7,612,478 B2 | | 11/2009 | Marioni | |
| 2007/0114867 A1 | * | 5/2007 | Marioni | 310/156.23 |

* cited by examiner

*Primary Examiner* — Tran Nguyen
(74) *Attorney, Agent, or Firm* — Thompson Coburn LLP

(57) ABSTRACT

A retaining sleeve for retaining magnets inserted therein so that the magnets may be overmolded with a polymer pursuant to the manufacture of a rotor for an electric motor. The retaining sleeve comprising a generally cylindrical portion having an inner peripheral surface concentric about a central axis and a plurality of retaining partitions extending inward from the inner peripheral surface of the generally cylindrical portion, wherein the retaining partitions are configured to at least substantially limit movement of the magnets toward the central axis upon the magnets being inserted in the retaining sleeve at their respective locations inward of the inner peripheral surface of the retaining sleeve and between retaining partitions.

21 Claims, 4 Drawing Sheets

RETAINING SLEEVE FOR OVER MOLDING MAGNETS

BACKGROUND OF THE INVENTION

1. Field of the Invention

This invention pertains generally to electric motors and generators. More specifically, this invention pertains to permanent magnet motors wherein the rotor is formed using permanent magnets secured to a core with plastic molded over the magnets and core.

2. General Background

In permanent magnet electric motors, establishing and maintaining magnet placement and spacing during manufacturing of the rotor is important. This is particularly the case with rotors formed with magnet segments that are secured to the rotor with over molded plastic. Prior art methods of establishing and maintaining magnet placement and spacing during manufacture include, using a die device with fixtures to secure the magnets in place and using a cup design to locate and orientate the magnets. However, using a die with fixtures makes the manufacturing process much more complicated and time consuming. Still further, the use of a cup design to locate and orientate the magnets during manufacture of the rotor requires that the rotor core be in place before the magnets can be placed in their proper locations.

SUMMARY OF THE INVENTION

The present invention is directed to a retaining sleeve for retaining magnets inserted therein so that the magnets may be overmolded with a polymer pursuant to the manufacture of a rotor for an electric motor. The retaining sleeve comprising a generally cylindrical portion having an inner peripheral surface concentric about a central axis and a plurality of retaining partitions extending inward from the inner peripheral surface of the generally cylindrical portion, wherein the retaining partitions are configured to at least substantially limit movement of the magnets toward the central axis upon the magnets being inserted in the retaining sleeve at their respective locations inward of the inner peripheral surface of the retaining sleeve and between retaining partitions.

Additionally, the present invention is directed to a rotor comprising: (i) a plurality of permanent magnets; (ii) a retaining sleeve that comprises a generally cylindrical portion having an inner peripheral surface concentric about a central axis and a plurality of retaining partitions extending inward from the inner peripheral surface of the generally cylindrical portion, wherein the magnets are within the retaining sleeve at their respective locations inward of the inner peripheral surface of the retaining sleeve and between retaining partitions such that the magnets are arranged angularly about the central axis, and wherein the retaining partitions are configured to at least substantially limit movement of the magnets toward the central axis; and (iii) a shaft substantially co-axial with the central axis and operatively attached to the retaining sleeve containing the plurality of magnets.

Further, the present invention is directed to a method of assembling a rotor, the method comprising: encasing (a) a retaining sleeve with a plurality permanent magnets that comprises axial end surfaces inserted in the retaining sleeve, wherein the retaining sleeve magnets comprises a generally cylindrical portion having an inner peripheral surface concentric about a central axis and a plurality of retaining partitions extending inward from the inner peripheral surface of the generally cylindrical portion, wherein the magnets are within the retaining sleeve at their respective locations inward of the inner peripheral surface of the retaining sleeve and between retaining partitions such that the magnets are arranged angularly about the central axis, and wherein the retaining partitions are configured to at least substantially limit movement of the magnets toward the central axis and (b) at least a portion of a shaft located co-axially with the retaining sleeve in an opposed pair of cooperative mold members contoured to matingly surround at least a portion of the axial end surfaces of the magnets and said portion of the shaft in a preselected spaced relationship therewith providing a space therebetween; and injecting a plastic molding material into said space to attach the shaft to the retaining sleeve containing the magnets.

The present invention is still further directed to an electric motor comprising: an external stator; and an internal permanent-magnet rotor comprising: a plurality of permanent magnets; a retaining sleeve that comprises a generally cylindrical portion having an inner peripheral surface concentric about a central axis and a plurality of retaining partitions extending inward from the inner peripheral surface of the generally cylindrical portion, wherein the magnets are within the retaining sleeve at their respective locations inward of the inner peripheral surface of the retaining sleeve and between retaining partitions such that the magnets are arranged angularly about the central axis, and wherein the retaining partitions are configured to at least substantially limit movement of the magnets toward the central axis; and a shaft substantially co-axial with the central axis and operatively attached to the retaining sleeve containing the plurality of magnets.

Figure 1:
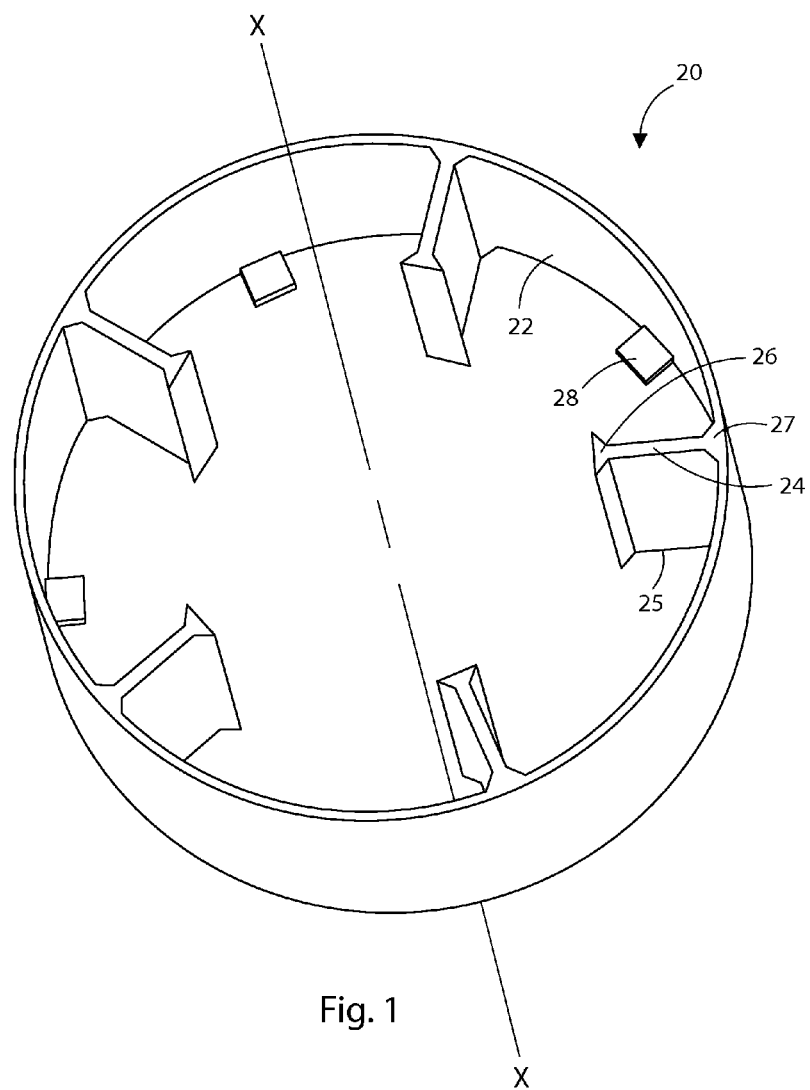
FIG. 1 is a perspective view of an embodiment of a retaining sleeve in accordance with the invention.

Reference numerals in the written specification and in the drawing figures indicate corresponding items.

DETAILED DESCRIPTION

The present invention provides an efficient means for locating and securing magnets in a proper orientation during the manufacturing of a permanent magnet rotor. The magnets are placed in a retaining sleeve that locates and secures the magnets in their proper orientation for manufacture by, among other things, supporting the magnets in the radial direction without the need for a core to be present or for complex die fixtures to be used.

Retaining Sleeve

The retaining sleeve is cylindrical or substantially cylindrical having inner and outer peripheral surface and retaining partitions extending inward from the inner peripheral surface that are configured to secure the magnets and prevent radial movement of the magnets. To be clear, as used herein the term "cylindrical" is not intended to include circular end surfaces of a cylinder such that the meaning of "cylindrical" is essentially the same as "tubular", unless expressly stated otherwise.

The retaining partitions can be of any configuration that (a) complements the shape of the magnets and (b) secures, prevents, or essentially limits the magnets from moving in a radial direction (i.e., a direction perpendicular to the central axis of rotation of the rotor assembly) after being inserted into the retaining sleeve. Additionally, the retaining partitions are typically arranged such that the magnets secured thereby will be spaced equidistant circumferentially about the retaining sleeve. It should also be noted that the cylindrical portion and/or the retaining partitions portions of the retaining sleeve may be solid along their entire longitudinal lengths and the retaining partitions extend along the entire longitudinal length of the cylindrical portion and vice versa as depicted in the Figures, this is not required. For example, in certain embodiments the retaining partitions may not extend along the entire longitudinal length of the cylindrical portion of the retaining sleeve or they may be spaced intermittently. Further, the cylindrical portion may be configured with void portions.

The material(s) used to make the retaining sleeve and the dimensions of the various portions of the retaining sleeve are selected to be appropriate for a particular application. For example, in "wet" rotor electric motor for a dishwashing machine pump applications, the retaining sleeve may be made from plastic/polymer (e.g., filled or non-filled polymer, wherein the polymer is linear, branched, or crosslinked, and is selected from the group consisting of polyester, polyethylene, polypropylene, polyamide, and copolymers thereof). In one embodiment of the present invention the retaining sleeve is made from glass or talc filled polypropylene. Although, plastic/polymer is a desirable material in terms of cost and ease of manufacture, it is possible that the retaining sleeve may be fabricated from other suitable materials such as metals or other composite materials. In such a wet rotor dishwashing machine embodiment, the outer peripheral surface of the retaining sleeve may have a diameter that is in the range of about 40 to about 60 mm, and the inner peripheral surface may have a diameter that is in the range of about 1 to about 2 mm less than that of the outer peripheral surface, the retaining partitions may have a length that in the range of about 5 to about 15 mm and a thickness that is in the range of about 1 to about 5 mm, and the retaining sleeve may have a height that is in the range of about 15 to about 30 mm. Additionally, in such wet rotor applications experimental results to date indicate that a ferromagnetic core inward of the magnets is generally not preferred to corrosion concerns resulting from contact with water despite being overmolded. For non-wet rotor applications a ferromagnetic core is preferably included as part of a rotor in order to improve the efficiency of a motor comprising said rotor.

Figure 2:
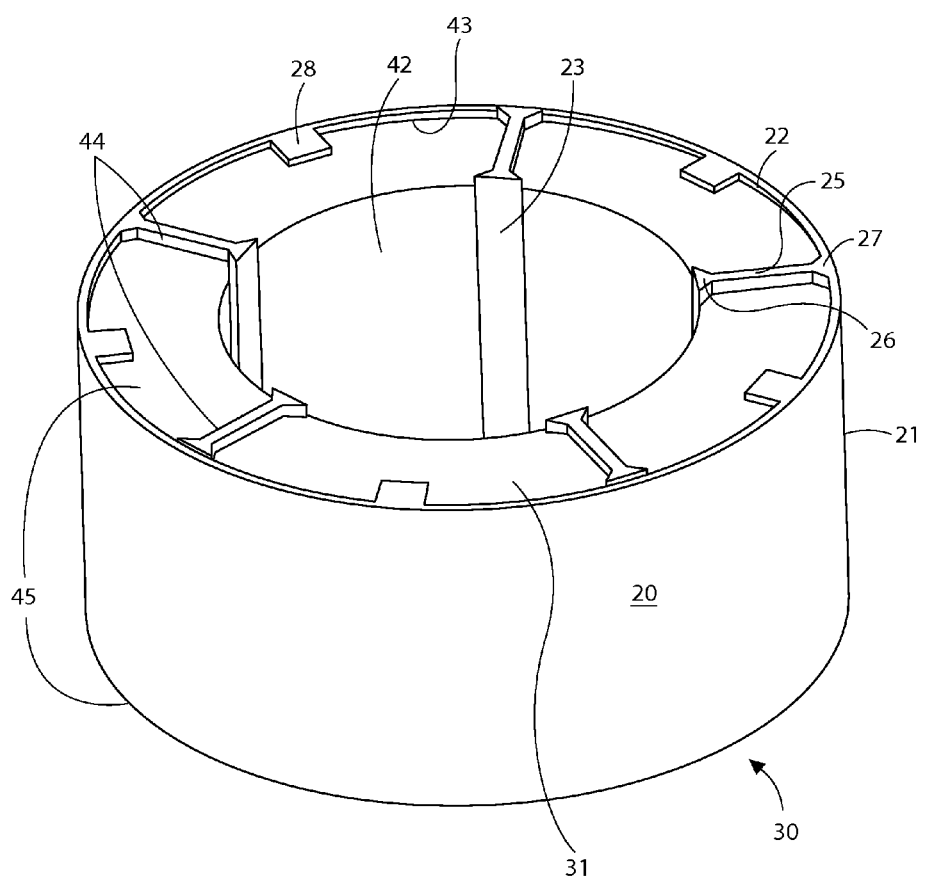
FIG. 2 is a perspective view of the retaining sleeve of FIG. 1 with magnets inserted between the radial retaining partitions of the retaining sleeve.

As depicted in FIG. 2 and described below, the magnets used to manufacture rotors for inner rotor-type rotors are generally arcuate in shape with an arcuate outer peripheral surface having a radius of curvature approximately equal to the radius of curvature of an inner peripheral surface of the retaining sleeve (or vice versa) and an arcuate inner peripheral surface having a smaller radius of curvature. In the case of a rotor with a ferromagnetic core, the radius of curvature for inner peripheral surface of the magnets would be approximately equal to the radius of curvature of an outer peripheral surface of a core. In certain embodiments, such magnets have side surfaces that are radial or substantially radial. In certain embodiments of magnets having radial or substantially radial side surfaces, the magnets may further comprise chamfered, beveled, or rounded surface portions between the radial surface portions and the inner peripheral and outer peripheral surfaces. In other embodiments, magnets may have side surfaces with little or no radial portions such that they are comprised mostly or entirely of chamfered, beveled, or rounded surfaces.

In accordance with above, the retaining partitions are configured to complement the shape of the magnets and secure, prevent, or essentially limit the magnets from moving in a radial direction after being inserted into the retaining sleeve. In view of this, in one embodiment of the retaining sleeve, the retaining partitions extend radially or substantially radially inward from the inner peripheral surface of the retaining sleeve towards the central axis of the retaining sleeve (which coincides with the central axis of a rotor assembled with the retaining sleeve). Typically, the retaining partitions are relatively narrow in comparison to the width of the magnets to minimize the spacing between the magnets. The retaining partitions may, however, in other embodiments have other non-radial configurations and still radially secure the magnets. For example, the retaining partition may be configured such that they are "angled inward" of their respective bisecting radian but such a configuration tends to result in an increase in the distance between adjacent magnets, which tends to be undesirable.

The number of retaining partitions is at least equal to the number of magnets to be inserted in the retaining sleeve. Stated another way, there is at least one, and typically only one, retaining partition between adjacent magnets such that each of the magnets is positioned in the retaining sleeve between two adjacent retaining partitions. That said, in accordance with the aforementioned "angled inward" embodiment, the number of retaining partitions may greater than the number of magnets (e.g., there could be two retaining partitions between adjacent magnets). Alternatively, a single relatively wide partition outward angled partition could provide the aforementioned inward angled surface for contacting magnets. In either case, in addition to tending to increase the distance between adjacent magnets, such an embodiment would tend to increase the amount of material used to make the retaining sleeve, which may be undesirable in terms of increased cost, decreased performance, or combination of the foregoing.

The retaining partitions may have additional features to increase the area of contact between magnets and retaining partitions. For example, each retaining partition may have one or two portions or ends that are wider than the middle section of the retaining partition that complement the bevelled, chamfered, or rounded portions of the sides of the magnets. In an exemplary configuration of such an embodiment, a cross-section of a radial retaining partition comprises rectangular middle portion with the greater length being in the radial direction and isosceles trapezoid-like opposite ends thereto, with the widest sides of the trapezoid-like shapes being at the ends and the narrowest sides of the trapezoid-like shapes being of a dimension corresponding to the width of the rectangular middle portion. Further, in accordance with the use of the present invention in the manufacture a wet rotor type motor for dishwashing machines, the dimensions of such end portions may be, for example, such that they have a thickness at the widest part in the range of about 2 to 5 mm, and angled surface that is at about 45° from a radian bisecting the radial partition.

The retaining partitions may be of any appropriate length (e.g., a radial distance from the inner peripheral surface of the retaining sleeve). Depending upon the configuration, for example, a configuration wherein the retaining partitions are radial, an appropriate length may be less than about the thickness of the magnets (i.e., the shortest distance between the inner and outer peripheral surfaces of the magnets). Alternatively, the length may be approximately equal to the thickness of the magnets. Although typically not considered desirable, the length of the retaining partitions may even be greater than the thickness of the magnets. Generally, it is desirable for radial retaining partitions to be of a length that is equal or approximately equal to the thickness of the magnets in order to ease insertion of the magnets and provide a relatively large amount of area of contact between the magnets and the retaining sleeve, which among other things tends to enhance the security of the magnets against movement and damage prior to being overmolded during handling and after overmolding during operation of a motor. Further, for retaining partitions of a length that is about equal or greater than the thickness of the magnets in applications that have a core, it is desirable for the core to be configured to complement the shape of the inward end of the retaining partitions or vice versa. An example of the latter would be to configure the ends of radial retaining partitions with a length about that of the magnet thickness with a radius of curvature that is approximately equal to the radius of curvature of the outer peripheral surface of the core.

The retaining sleeve may also have one or more protrusions extending inward (preferably radially) of the inner peripheral surface of the retaining sleeve and configured to contact an axial end surface of said magnets, which prevent the magnets from moving axially past the protrusions. The protrusions may be of a variety of shapes and sizes but at least a portion of each protrusion should contact at least a portion of the axial end surface of a magnet such that the magnet is restricted from moving axially (parallel to the central axis of rotation of the rotor) past the protrusion. In other words, if a retaining sleeve of the present invention has such protrusions each magnet may only be inserted into the sleeve in a single direction.

As mentioned, the shape and size of the protrusion(s) may be of anything that is appropriate for the application. For example retaining sleeve may comprise protrusions configured to be tabs that are equal in number to the number of magnets, wherein the tabs a situated approximately half way between retaining partitions. Further, in accordance with the use of the present invention in the manufacture a wet rotor type motor for dishwashing machines, the dimensions of such tabs may be, for example, such that they have a thickness that is in the range of about 0.5 to 2 mm, a width in the range of about 2 to about 5 mm, and a length in the range of about 2 to about 5 mm. Alternatively, the retaining sleeve may comprise a single protrusion corresponding to a ring or annular lip extending inward from the circumferential edge of the retaining sleeve rather than multiple tabs. Other possible alternatives, include but are not limited to multiple indentations or a single inward ridge. The location of the protrusion(s) may be at essentially any appropriate location(s). For example, in the embodiment depicted in the Figures, the tab-type protrusions are at one end of the sleeve such that the all the magnets are inserted into the sleeve in the same direction but the protrusions need not all be at one end. For example, the protrusion could be configured such that some number of the magnets are inserted in one direction and the remainder of the magnets are inserted in the opposite direction. Further, the protrusion need not be at the end of the retaining sleeve but some distance axially inward from an end. Such a configuration, would typically not preferred because it would tend to result in a sleeve and rotor having an axially length that is longer than if the protrusions were at an end. It is generally not desirable for the protrusion(s) to extend radially inward past the inner peripheral surface of the magnets because it tends to be an unnecessary use of material and it tends to restrict access to the magnets during the overmolding.

An exemplary embodiment of a retaining sleeve, generally indicated by reference numeral 20, in accordance with the invention is shown in FIGS. 1, 2, 3, and 4. The retaining sleeve 20 comprises an outer peripheral surface 21, an inner peripheral surface 22, a plurality of radial retaining partitions 23, and a plurality of radial protrusions 28. The radial retaining partitions 23 extend radially inward towards a central axis x-x. The radial retaining partitions comprise axial end surfaces 24, 25 and opposite radial ends 26, 27. The cross section of the radial retaining partitions 23 are generally an elongated rectangle with opposite radial ends 26 and 27 both wider than the middle rectangular section same with isosceles trapezoidal shapes.

The retaining sleeve and magnet assembly, generally indicated by reference numeral 30, in accordance with the invention is shown in FIG. 2. The magnets 31 have an arcuate inner peripheral surface 42, an arcuate outer peripheral surface 43, side surfaces 44, which are substantially radial with chamfered edges, each extending from the inner peripheral surface 42 to the outer peripheral surface 43, and opposite axial end surfaces 45. The radial retaining partitions 23, including the radial ends 26 are of complementary shape to the side surfaces 44 of the magnets 31 and secure the magnets 31 radially and limit their radial movement in a direction toward the central axis X-X. Whereas the inner peripheral surface 22 and radial ends 27 of the radial retaining partitions 23 limit the radial movement of the magnet 31 in a direction away form the central axis X-X. The radial protrusions 28 contact an axial end surface 45 of the magnets 31 and limit the axial movement of the magnets 31 such that the inserted magnets cannot move past the protrusions. Stated another way, when the magnets are inserted into the sleeve such that they are in contact with the protrusions, the magnets are only free to move axially parallel to the x-x axis in a direction away from the protrusions. Additionally, adjacent radial retaining partitions 23 limit rotational movement of the magnets 31 about the central axis X-X. Thus, the retaining sleeve 20 locates and maintains the position of the magnets 31 about the X-X axis and limits movement of the magnets 31 in all but one direction, the direction in which the magnets 31 are inserted into the retaining sleeve 20.

Assembling a Rotor

The present invention is also directed to a method of assembling a rotor that comprises inserting the magnets into an above-described retaining sleeve in the spaces formed between the retaining partitions and the inner peripheral surface of the generally cylindrical portion. If a core is to be present, the method further inserting the core into the axial opening corresponding to the inner peripheral surface of the inserted magnets and the inner end surface of the retaining partition of the retaining sleeve. The method further comprises locating the shaft co-axially with the retaining sleeve, magnets, and core (if present) thereby forming a pre-molded assembly of rotor components. Additionally, the method comprises encasing the assembly (save for portions of the shaft that are not be overmolded) in an opposed pair of cooperating mold members contoured to matingly surround at least the axial end surfaces of the magnets in a preselected spaced relationship therewith providing a space therebetween; and injecting a plastic molding material into the preselected space between the mold members such that at least the axial end surfaces of the magnets are covered with plastic and the magnets, retaining sleeve, core (if present), and shaft form a unified overmolded rotor that may comprise one or more additional features formed from the overmolded plastic. For example, when there is no core, the mold members may be configured such the preselected space between the mold members results in a portion of the overmolded plastic forming a hub connecting the shaft to the retaining sleeve and magnets. It should be noted that mold may be configured to allow the outer peripheral surface of the retaining sleeve to be overmolded in plastic.

In yet still another aspect of the invention, if the retaining sleeve does not comprise the aforementioned protrusion(s) for preventing axial movement of the inserted magnets past the protrusions, the method of assembling a rotor comprises encasing the sleeve-magnet-core assembly in an opposed pair of cooperating mold members having axial pins to position the magnets axially within the mold. Additionally, the mold members are contoured to matingly surround the outer surface of the permanent magnets and retaining sleeve in a preselected spaced relationship therewith providing a space therebetween; and injecting a plastic molding material into the preselected space between the molds and the outer peripheral surfaces of the magnets and retaining sleeve to encapsulate the magnets and retaining sleeve in a unified integral plastic molded casing.

Rotor

The present invention is also directed to a rotor comprising a retaining sleeve in accordance with the foregoing into which the magnets are inserted, and a shaft located co-axially with the retaining sleeve and operatively attached to the retaining sleeve with the magnets. In one embodiment of the invention, the operative attachment is via overmolded plastic that encapsulates the exposed axial end surfaces of the magnets and secures the shaft to the retaining sleeve-magnet assembly. In an embodiment with a core, the operative attachment of the shaft to the retaining sleeve with magnets may be via (a) the core such that the inner peripheral surface of the core is in contact with the shaft and an outer peripheral surface of the core is in close proximity to or in contact with at least a portion of the inner peripheral surfaces of the magnets and (b) and overmolded plastic the encapsulates the exposed axial end surface of the magnets and secures the core to the retaining sleeve-magnet assembly.

Figure 3:
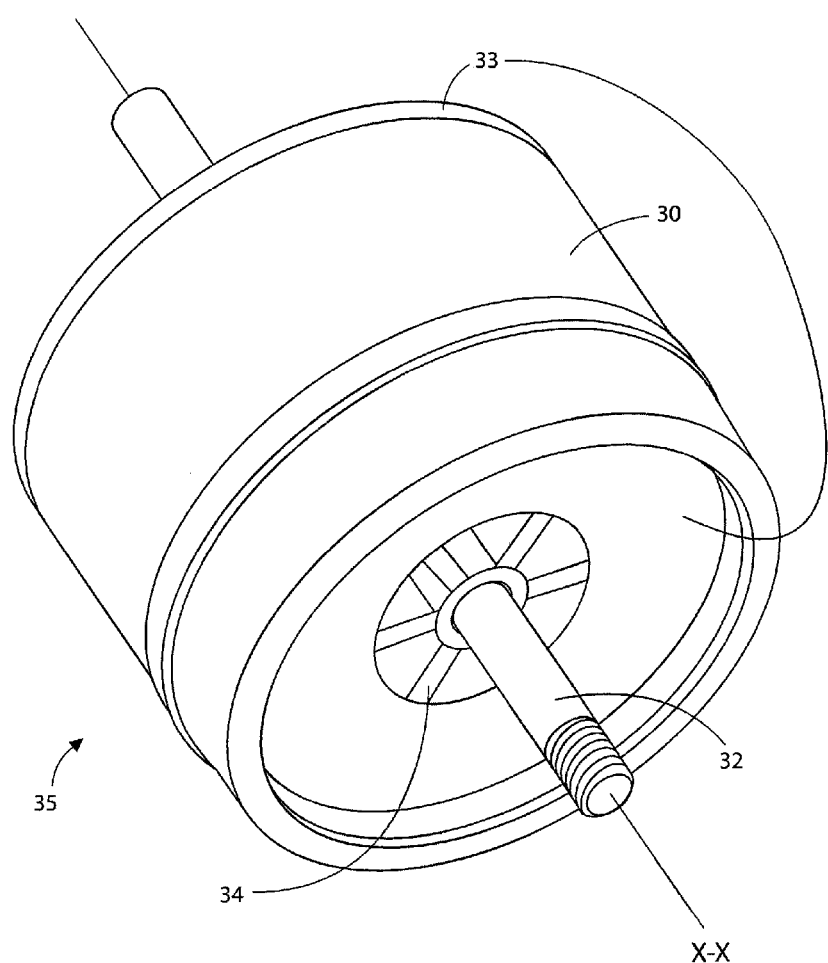
FIG. 3 is a perspective view of a rotor in accordance with the invention.
Figure 4:
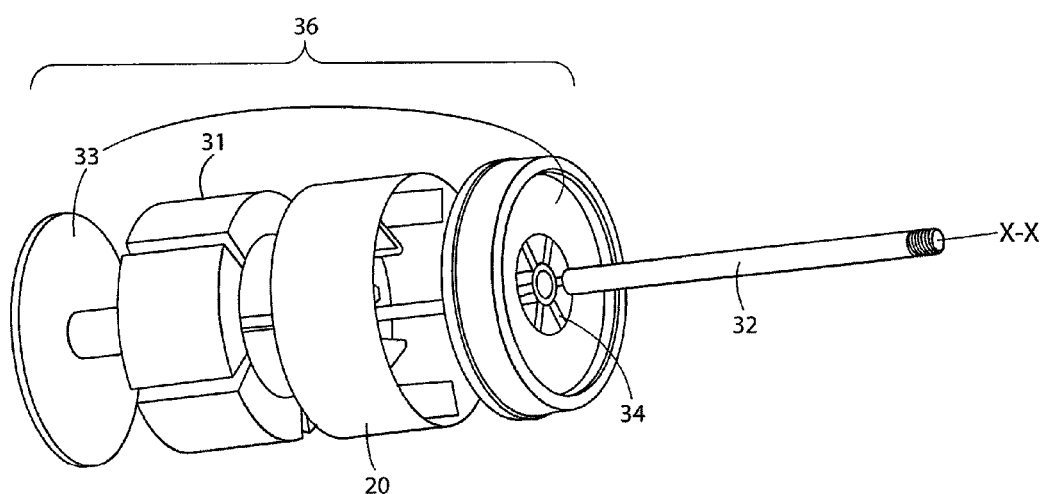
FIG. 4 is a perspective exploded view of a rotor in accordance with the invention.

An exemplary embodiment of an assembled rotor, generally indicated by reference numeral 35, in accordance with the invention is shown in FIGS. 3 and 4. The rotor 35 comprises a shaft 32 formed of stainless steel, a retaining sleeve and magnet assembly 30, and overmolded plastic 36 a portion of which 33 covers the axial end surfaces of the magnets and another portion of which 34 functions as hub.

Miscellaneous

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed unless unambiguously stated otherwise.

What is claimed is:

1. A rotor for a wet rotor electric motor comprising:
a plurality of permanent magnets;
a polymeric retaining sleeve, formed prior to the manufacture of the rotor, that comprises a generally cylindrical portion having an inner peripheral surface concentric about a central axis and a plurality of retaining partitions extending inward from the inner peripheral surface of the generally cylindrical portion, wherein the magnets are within the retaining sleeve at locations inward of the inner peripheral surface of the retaining sleeve and between retaining partitions such that the magnets are arranged angularly about the central axis, and wherein the retaining partitions are configured to at least substantially limit movement of the magnets toward the central axis; and
a stainless steel shaft substantially co-axial with the central axis and operatively attached to the retaining sleeve containing the plurality of magnets with overmolded plastic, which also, in conjunction with the retaining sleeve, encapsulates the magnets; and
wherein the rotor does not contain a ferromagnetic core between the shaft and the magnets.

2. The rotor of claim 1 wherein the retaining partitions are configured to extend inward radially from the inner peripheral surface toward the central axis, and the plurality of retaining partitions are of a number, the magnets are of a number and the number of retaining partitions equals the number of magnets.

3. The rotor of claim 2 wherein each magnet further comprises an arcuate outer peripheral surface and an arcuate inner peripheral surface and a thickness equal to the radial distance between the arcuate outer peripheral surface and the arcuate inner peripheral surface, and each retaining partition is configured to have a radial length, extending inward radially from the inner peripheral surface of the retaining sleeve toward the central axis, and said radial length of the retaining partition is no greater than about the thickness of a magnet.

4. The rotor of claim 3 wherein each retaining partition has a cross-section that comprises a rectangular middle portion and two isosceles trapezoid-like end portions.

5. The rotor of claim 1 wherein the retaining sleeve further comprises one or more protrusions extending inward from the inner peripheral surface of the retaining sleeve that are configured to contact an axial end surface of one or more of the magnets upon the one or more magnets being inserted in the retaining sleeve so that the inserted one or more magnets are restricted from moving axially past the one or more protrusions.

6. The rotor of claim 4 wherein the retaining sleeve further comprises one or more protrusions extending inward from the inner peripheral surface of the retaining sleeve that are configured to contact an axial end surface of one or more of the magnets upon the one or more magnets being inserted in the retaining sleeve so that the inserted one or more magnets are restricted from moving axially past the one or more protrusions.

7. The rotor of claim 6 wherein the protrusions are of a number that is equal to the number of magnets to be inserted into the retaining sleeve and the protrusions are tabs and all the tabs are situated at one axial end of the retaining sleeve approximately halfway between retaining partitions.

8. A method of assembling a rotor for a wet rotor electric motor, the method comprising:

(a) providing a polymeric retaining sleeve for retaining permanent magnets inserted therein during overmolding with a polymer, wherein the retaining sleeve is formed prior to the overmolding, and wherein the retaining sleeve comprises (i) a generally cylindrical portion having an inner peripheral surface concentric about a central axis, and (ii) a plurality of retaining partitions extending inward from the inner peripheral surface of the generally cylindrical portion, wherein the retaining partitions are configured to at least substantially limit movement of the magnets toward the central axis upon the magnets being inserted in the retaining sleeve at locations inward of the inner peripheral surface of the retaining sleeve and between the retaining partitions;

(b) inserting a plurality of permanent magnets that comprise axial end surfaces into the retaining sleeve at locations inward of the inner peripheral surface of the retaining sleeve and between retaining partitions such that the magnets are arranged angularly about the central axis;

(c) encasing the retaining sleeve with the plurality of permanent magnets inserted in the retaining sleeve and at least a portion of a stainless steel shaft located co-axially with the retaining sleeve in an opposed pair of cooperative mold members contoured to matingly surround at least a portion of the axial end surfaces of the magnets and said portion of the shaft in a preselected spaced relationship therewith providing a space therebetween; and (d) injecting a plastic molding material into said space to attach the shaft to the retaining sleeve containing the magnets and encapsulate, in conjunction with the retaining sleeve, the magnets; and wherein the method does not comprise inserting a ferromagnetic core between the shaft and the magnets.

9. The method of claim 8 wherein the retaining partitions are configured to extend inward radially from the inner peripheral surface toward the central axis, and the plurality of retaining partitions are of a number, the magnets are of a number and the number of retaining partitions equals the number of magnets.

10. The method of claim 9 wherein each magnet comprises an arcuate outer peripheral surface and an arcuate inner peripheral surface and a thickness equal to the radial distance between the arcuate outer peripheral surface and the arcuate inner peripheral surface, and each retaining partition is configured to have a radial length, extending inward radially from the inner peripheral surface of the retaining sleeve toward the central axis, and said radial length of the retaining partition is no greater than about the thickness of a magnet.

11. The method of claim 10 wherein each retaining partition has a cross-section that comprises a rectangular middle portion and two isosceles trapezoid-like end portions.

12. The method of claim 8 wherein the retaining sleeve further comprises one or more protrusions extending inward from the inner peripheral surface of the retaining sleeve that are configured to contact an axial end surface of one or more of the magnets upon the one or more magnets being inserted in the retaining sleeve so that the inserted one or more magnets are restricted from moving axially past the one or more protrusions.

13. The method of claim 12 wherein the retaining sleeve further comprises one or more protrusions extending inward from the inner peripheral surface of the retaining sleeve that are configured to contact an axial end surface of one or more of the magnets upon the one or more magnets being inserted in the retaining sleeve so that the inserted one or more magnets are restricted from moving axially past the one or more protrusions.

14. The method of claim 13 wherein the protrusions are of a number that is equal to the number of magnets to be inserted into the retaining sleeve and the protrusions are tabs and all the tabs are situated at one axial end of the retaining sleeve approximately halfway between retaining partitions.

15. An electric wet rotor motor comprising:
an external stator; and
an internal permanent-magnet rotor comprising:
    a plurality of permanent magnets;
    a polymeric retaining sleeve, formed prior to the manufacture of the internal permanent-magnet rotor, that comprises a generally cylindrical portion having an inner peripheral surface concentric about a central axis and a plurality of retaining partitions extending inward from the inner peripheral surface of the generally cylindrical portion, wherein the magnets are within the retaining sleeve at locations inward of the inner peripheral surface of the retaining sleeve and between retaining partitions such that the magnets are arranged angularly about the central axis, and wherein the retaining partitions are configured to at least substantially limit movement of the magnets toward the central axis; and
    a stainless steel shaft substantially co-axial with the central axis and operatively attached to the retaining sleeve containing the plurality of magnets with overmolded plastic, which also, in conjunction with the retaining sleeve, encapsulates the magnets; and
    wherein the rotor does not contain a ferromagnetic core between the shaft and the magnets.

16. The electric motor of claim 15 wherein the retaining partitions are configured to extend inward radially from the inner peripheral surface toward the central axis, and the plurality of retaining partitions are of a number, the magnets are of a number and the number of retaining partitions equals the number of magnets.

17. The electric motor of claim 16 wherein each magnet comprises an arcuate outer peripheral surface and an arcuate inner peripheral surface and a thickness equal to the radial distance between the arcuate outer peripheral surface and the arcuate inner peripheral surface, and each retaining partition is configured to have a radial length, extending inward radially from the inner peripheral surface of the retaining sleeve toward the central axis, and said radial length of the retaining partition is no greater than about the thickness of a magnet.

18. The electric motor of claim 17 wherein each retaining partition has a cross-section that comprises a rectangular middle portion and two isosceles trapezoid-like end portions.

19. The electric motor of claim 15 wherein the retaining sleeve further comprises one or more protrusions extending inward from the inner peripheral surface of the retaining sleeve that are configured to contact an axial end surface of one or more of the magnets upon the one or more magnets being inserted in the retaining sleeve so that the inserted one or more magnets are restricted from moving axially past the one or more protrusions.

20. The electric motor of claim 18 wherein the retaining sleeve further comprises one or more protrusions extending inward from the inner peripheral surface of the retaining sleeve that are configured to contact an axial end surface of one or more of the magnets upon the one or more magnets being inserted in the retaining sleeve so that the inserted one or more magnets are restricted from moving axially past the one or more protrusions.

21. The electric motor of claim 20 wherein the protrusions are of a number that is equal to the number of magnets to be inserted into the retaining sleeve and the protrusions are tabs and all the tabs are situated at one axial end of the retaining sleeve approximately halfway between retaining partitions.

* * * * *